(12) United States Patent
Banks

(10) Patent No.: US 7,267,181 B2
(45) Date of Patent: Sep. 11, 2007

(54) CULTIVATING DEVICE

(75) Inventor: John Banks, Fairfield (AU)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/525,293

(22) PCT Filed: Oct. 3, 2002

(86) PCT No.: PCT/US02/31663

§ 371 (c)(1),
(2), (4) Date: Feb. 15, 2005

(87) PCT Pub. No.: WO2004/016070

PCT Pub. Date: Feb. 26, 2004

(65) Prior Publication Data

US 2005/0263300 A1 Dec. 1, 2005

Related U.S. Application Data

(60) Provisional application No. 60/403,693, filed on Aug. 15, 2002.

(51) Int. Cl.
*A01B 45/02* (2006.01)
(52) U.S. Cl. ....................................... 172/21
(58) Field of Classification Search ................. 172/21, 172/85, 101, 97, 22, 125
See application file for complete search history.

(56) References Cited

U.S. PATENT DOCUMENTS 2,236,562 A * 4/1941 Brandes ..................... 172/22
3,136,274 A * 6/1964 Townsend ................. 111/118
3,856,090 A * 12/1974 Haffner et al. ............. 172/20
3,878,899 A * 4/1975 Jones ........................ 172/21

(Continued)

FOREIGN PATENT DOCUMENTS

AU    A-73500/87    * 5/1986

*Primary Examiner*—Victor Batson
(74) *Attorney, Agent, or Firm*—The Law Office of Randall T. Erickson, P.C.

(57) ABSTRACT

A cultivator for aerating a ground surface. The cultivator has a support frame moveable relative to the ground surface and a follower first pivotally connected to the support frame by a first pair of spaced link arms. The link arms have two pairs of equidistantly spaced pivot points for linear movement of the follower in a first direction away from the support frame. A tool support member is pivotally connected to the follower by a second pair of spaced link arms. The second link arms have two pairs of equidistantly spaced pivot points for linear movement of a cultivating tool in a second direction substantially perpendicular to the first direction. A driver effects cyclic movement of the tool support member in the second direction and movement of the follower in the first direction. A bias element provides resilient damping of the movement of the follower along the first direction away from the support frame, wherein the resilient damping is provided at an extremity of movement of the follower outward from the support frame along the first direction, to urge the follower in the direction of inward movement toward the support frame. A dampening element provides resilient damping of the movement of the follower along the first direction toward the support frame, the resilient damping provided at an extremity of movement of the follower inward toward the support frame in the first direction to progressively arrest movement of the follower in the direction of inward movement toward the support frame.

19 Claims, 16 Drawing Sheets

U.S. PATENT DOCUMENTS

| | | | |
|---|---|---|---|
| 3,913,682 A * | 10/1975 | Kaercher et al. | 172/20 |
| 4,422,510 A * | 12/1983 | de Ridder | 172/21 |
| 4,632,189 A * | 12/1986 | Rizzo | 172/22 |
| 4,632,192 A * | 12/1986 | Hooks | 172/19 |
| 4,750,565 A * | 6/1988 | Hansen et al. | 172/22 |
| 5,570,746 A * | 11/1996 | Jones et al. | 172/22 |
| 5,797,458 A * | 8/1998 | Simon et al. | 172/2 |
| 5,988,290 A * | 11/1999 | Banks | 172/21 |

* cited by examiner

CULTIVATING DEVICE

This application claims the benefit of U.S. Ser. No. 60/403,693 filed Aug. 15, 2002, and is also a continuation-in-part of PCT/US2002/07738, filed Mar. 15, 2002.

FIELD OF THE INVENTION

This invention relates to a cultivator for aerating ground surfaces. The invention has particular application to cultivators for aerating turf surfaces, such as golf courses, sporting grounds, bowling greens and the like.

BACKGROUND ART

Cultivators of this type are used for maintaining landscaped ground surfaces, including turf. In this sense the term "turf" refers to grass and other material which is specifically grown for playing sport and used for example to form golf course greens, sporting fields and bowling greens. Cultivators are frequently used on these types or surfaces for repeatedly penetrating the ground surface, forming a plurality of holes so that the ground surface is aerated, to improve growth of the grass or other material and enhance the condition of the surface for playing purposes.

In conducting this type of aeration of turf surfaces, the neatness of the edges of the hole made by the cultivator can significantly affect the overall result. For example in the case of golfing or bowling greens and the like where the vegetation is short, a hole with rough edges or too large a hole can cause spot erosion, resulting in an undesirable dimple in the ground surface. This effect is aggravated when the forward movement of a cultivator differs from the speed of the hole-making tool over the ground surface, causing the hole-making tool to "break" the ground surface. Often this problem is encountered in cultivators powered by a link to a prime mover (such as a tractor), where difficulties in synchronising the speed of the hole making tool with the speed of the prime mover, arises, for example due to different gear ratios between the driving wheels of the tractor and the power link.

One known cultivator described in Australian Patent Application 73500/87 has a structure mounted on ground engaging wheels with tool support means mounted on the frame so that the tool support means is moveable relative to the structure. A cultivating tool, usually a tine or series of tines is mounted on a flat plate so that the tine(s) are relatively vertical to the plate. The plate is mounted on the tool support means via a pair of link arms so that the plate (and vertical tines) freely pivots relative to the tool support means.

As the cultivator moves forward along the ground surface (via a prime mover), the fly wheel drives one end of the tool support member in a circular path. This causes the other end of the tool support means to move in a reciprocating motion so that the cultivating tool is repeatedly forced into the ground surface. This cycle of reciprocating motion of repeated penetrations by the cultivation tool is used to produce holes and is generally referred to as an aeration time cycle. The horizontal plate freely pivots about the tool support means via link arms, so that the cultivating tool tends to be substantially vertical despite the rotation of the fly wheel during the aeration time cycle. Accordingly, the cultivating tool is kept substantially vertical for entry and withdrawal from the ground surface as the link arms will pivot to compensate for forward motion of the cultivating device. That is, at each part of the cycle in which the tool is withdrawn from the ground surface, the freely pivoting link arms positions the cultivation tool in a substantially vertical position for the next cycle of penetration into the ground. This means that fairly neat holes are produced in the ground through this flywheel arrangement.

While this cultivator achieves fairly neat holes in ground surfaces such as turf, the free pivoting arrangement of the cultivation tool restricts the depth of holes that can be produced. This is at least partly the result of the above described cultivator not being suitable for scaling up in size. If this cultivating device is directly scaled up to a larger machine to provide deeper holes, the number of holes in a given surface area would reduce because the distance between holes formed by the cultivating tool would also be scaled upward. The distance between these holes would increase because the necessary scaling up of the size of the flywheel is to increase vertical travel of the cultivating tool. While it has been proposed to use a plate of increased area to cover this increased distance (using a larger number of tines per plate), such plates are unwieldy and awkward as well as requiring greatly increased power to effect penetration of the larger number of tines.

DISCLOSURE OF THE INVENTION

It is an object of this invention to provide a cultivator for aerating a ground surface that will overcome one or more of the above disadvantages or at least provide a useful alternative.

According to an aspect of the invention, there is provided a cultivator for aerating a ground surface including:

a support frame moveable relative to the ground surface;

a follower pivotally connected to the support frame by a first pair of link arms having two pairs of equidistantly spaced pivot points for linear movement of the follower in a first direction away from the support frame;

a tool support member pivotally connected to the follower by a second pair of link arms having two pairs of equidistantly spaced pivot points for linear movement of a cultivating tool in a second direction substantially perpendicular to the first direction;

and a driver to selectively effect cyclic movement of the tool support member in said second direction and effect movement of the follower in said first direction at a substantially constant rate during at least a selected portion of said cyclic movement corresponding to ground engagement of the cultivating tool.

The link arm arrangement of the cultivator device allows the follower and the tool support member to linearly move in the second direction during engagement with the ground surface as the support frame moves over the ground surface. That is, the first and second pairs of link arms compensate for the increasing distance between the support frame and the tool support member caused by the support frame moving along the ground surface so that the tool support member is effectively stationary when the cultivation tool is engaged in the ground surface.

Preferably, the first direction is substantially parallel to the ground surface while the second direction is preferably substantially perpendicular to the ground surface. In this form of the invention, the tool support member is kept substantially perpendicular relative to the ground surface when penetrating and withdrawing from the ground surface.

This in turn ensures that a substantially perpendicular hole is produced, avoiding any ragged edges and undesirable pressure on the side wall of the tined hole.

In addition, the cycle time can be varied quite easily by increasing the frequency in which the driver operates (hereinafter referred to as the "driver frequency"), thereby producing more holes in a given surface area. There is no tendency for the tine to propel the cultivator so that if the cultivator device is scaled up in size, the driver frequency can be increased to ensure that the same number of holes for a given surface area is produced, compensating for the larger distance between "hits". This avoids the difficulty in scaling up of the known cultivator where the flywheel radius imposes a physical constraint.

The first pair of link arms preferably maintains the follower in a fixed or constant orientation to the support frame. It is preferred that the first pair of link arms are substantially parallel to each other. One link arm of the first pair of link arms may be pivotally connected to the support frame via a support arm. One or more of the first, pair of link arms can be bent to form an included obtuse angle.

Preferably, the second pair of link arms are substantially parallel to each other. In a preferred embodiment, the follower, second pair of link arms and the tool support member substantially form a parallelogram. The tool support member forms the side of the parallelogram furthest from the support frame. One or more of each the first and second link arms can be formed by two parallel elements.

The driver is preferably pivotally connected to one link arm of the second pair of link arms. The driver can lie substantially parallel to one link arm of the first pair of link arms when effecting selective cyclic movement in the second direction.

The driver can be pivotally connected to the support frame. It is preferred that the driver is mounted to the support frame via a support arm. The driver is preferably mounted to the same support arm that pivotally connects one link arm of the first pair of link arms. In a preferred embodiment, driver and the link arm can be arranged on the support arm so that they are substantially parallel to each other.

In one embodiment the driver is a linearly operable device such as hydraulic or pneumatic cylinder controlled by a hydraulic or pneumatic circuit. In another embodiment the driver is a mechanical arrangement which imparts reciprocating movement to the link arm assembly. Preferably, the mechanical arrangement includes a flywheel and a connecting rod. The connecting rod is preferably connected to one of the first pair of link arms. The flywheel is preferably driven in rotation by a suitable power source, for example by vee belt connection. The connection between the drive and link arm assembly, for example the hydraulic cylinder or connecting rod is preferably arranged to aid the desired overall movement in the first direction during each part of the cycle of operation. That is the driver connection preferably aids movement of the tool support away from the support frame during at least part of the cycle time in which the ground is engaged. More preferably, the movement is aided at the critical time on the upstroke as the tool is emerging from the ground. Preferably the driver connection also aids movement of the tool support toward the support frame at the end of the cycle following completion of ground engagement.

It is preferred that a bias element is located between the follower and the support frame for assisting the follower to be returned to a rest position in the cycle. It is preferred that the bias element is located at the junction between the support frame and the link arm. The bias member can in one form of the invention engage one end of the link arm.

In one embodiment a stop is located on the follower for dampening forces produced by the driver in returning the follower to the rest position. The stop is preferably located at one corner of the parallelogram. The corner is preferably the corner that is closest to both the support frame and the ground surface.

In another embodiment of the invention a dampening block is arranged in a position to prevent bounce when the tool is returned to the top of stroke position by the bias element. A cam surface carried by one of the links rotates to engage the dampening block to arrest the rebound or bounce as the tool returns to its top of stroke position.

In one form of the invention the support frame can include ground engaging wheels for moving along the ground surface. Equally however the cultivator can be in a form suitable for mounting to the three-point linkage of a tractor. In this case the tractor can supply driving power to the cultivator either hydraulic power from an auxiliary hydraulic outlet on the tractor or mechanical power from the tractor power take-off.

Numerous other advantages and features of the present invention will be become readily apparent from the following detailed description of the invention and the embodiments thereof, from the claims and from the accompanying drawings.

To assist in the understanding of the invention, some embodiments of the invention will now be described by way of example only, with reference to the drawings:

BEST MODES OF CARRYING OUT THE INVENTION

Figure 1:
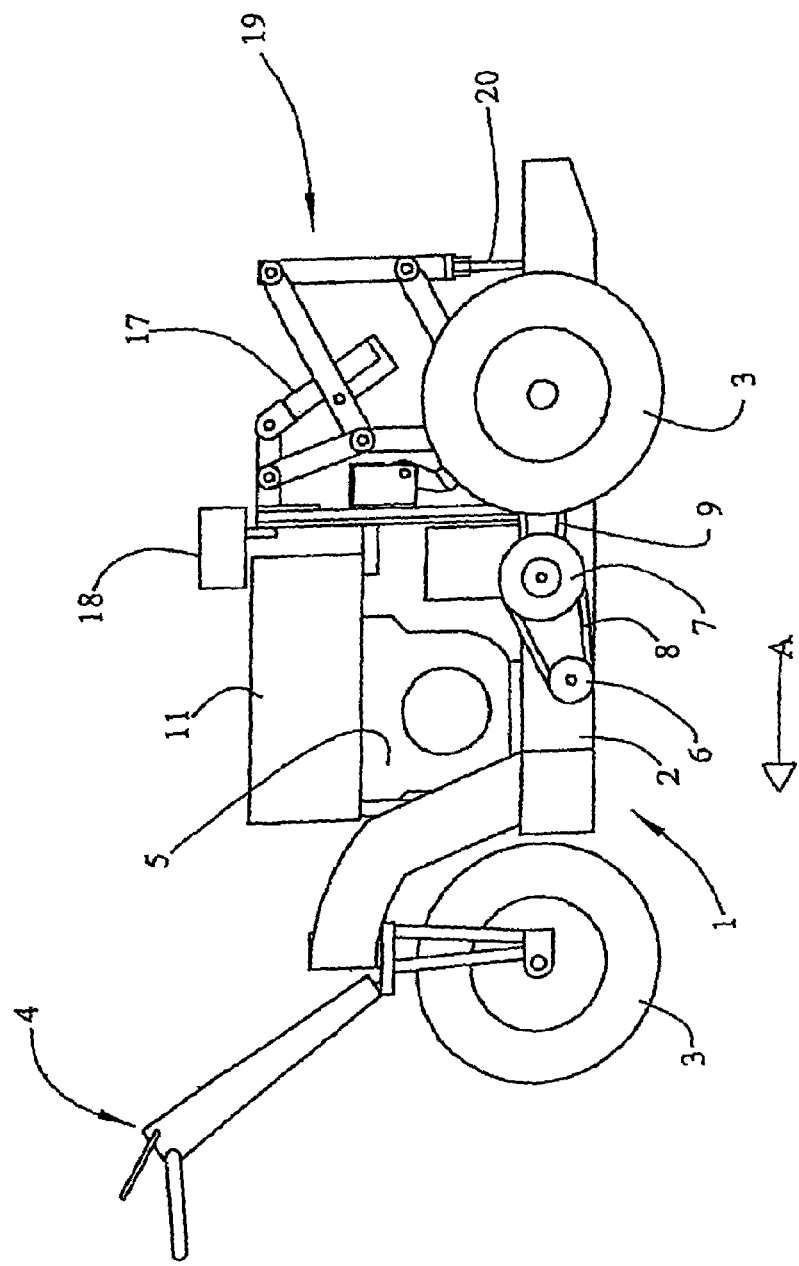
FIG. 1 is a side view of a cultivator according to a first embodiment of the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIGS. 1 to 13 show a cultivating device 1 for aerating ground surfaces according to one embodiment of the present invention. The cultivating device 1 has support frame 2, to which ground engaging wheels 3 are mounted for moving the cultivating device along the ground surface. The cultivator is of the tricycle type with two drive wheels 3 and a steering wheel 3 pivotally mounted to frame 2. A handle arrangement 4 provides for control of the steering wheel 3 by an operator and also provides a convenient location for mounting of cultivator controls (not shown). An engine 5 is mounted on the support frame 2 to drive the cultivating device 1 across the ground via one or more of the wheels 3 and to drive a hydraulic system described below. The drive of wheel 3 is of conventional type through a gearbox (not shown) and appropriate sprockets 6 and 7 and chains 8, 9. This drive system is of the type known to those skilled in the art and will not be described in detail. Arrow A shows the direction of normal travel of the cultivator.

Engine 5 also drives a hydraulic pump 10 supplied with hydraulic oil from a reservoir 11 via pipe 12. Any suitable hydraulic component can be used to supply hydraulic pressure for operation of the hydraulic system described below. Hydraulic pressure from pump 10 is supplied via pipe 13 to a distribution manifold 14 which provides hydraulic pressure to solenoid valves 15 and flow control valves 16 for operation of hydraulic cylinders 17. An electronic control system 18 is provided for operation of the hydraulic system.

Figure 3:
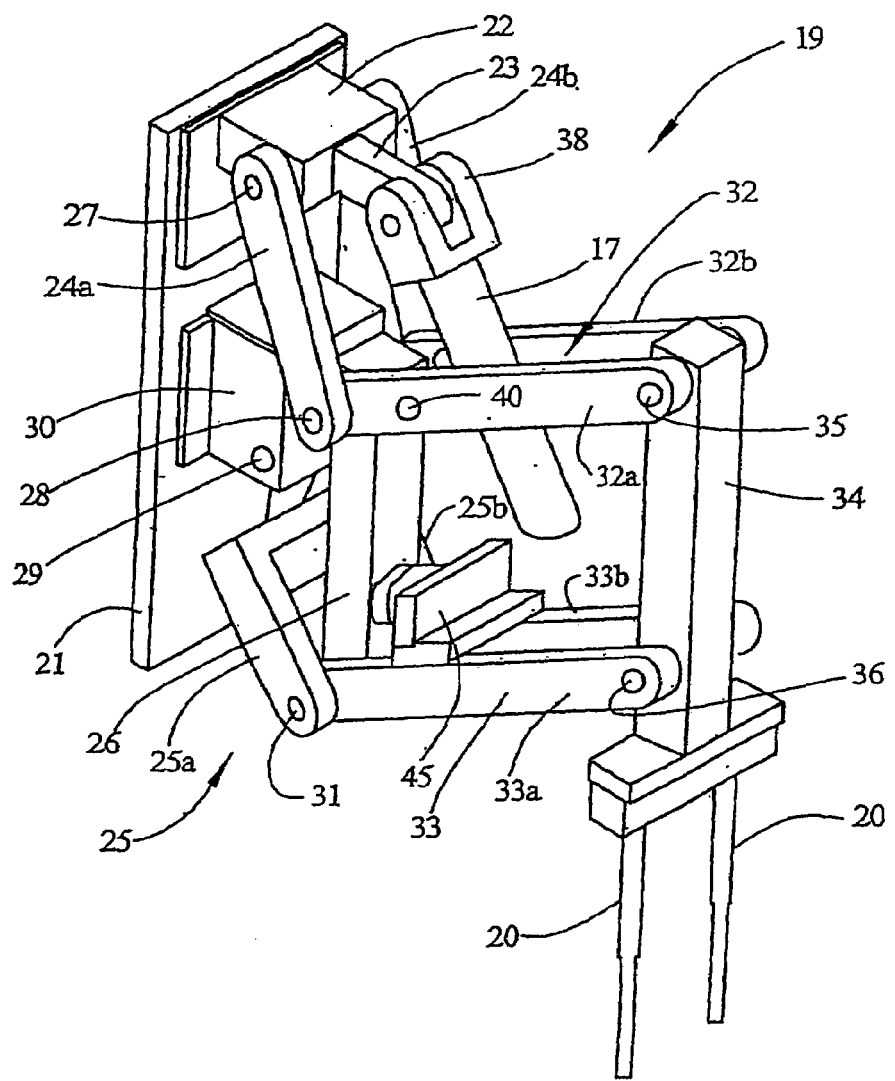
FIG. 3 is a perspective view of part of the cultivator of FIG. 1.
Figure 4:
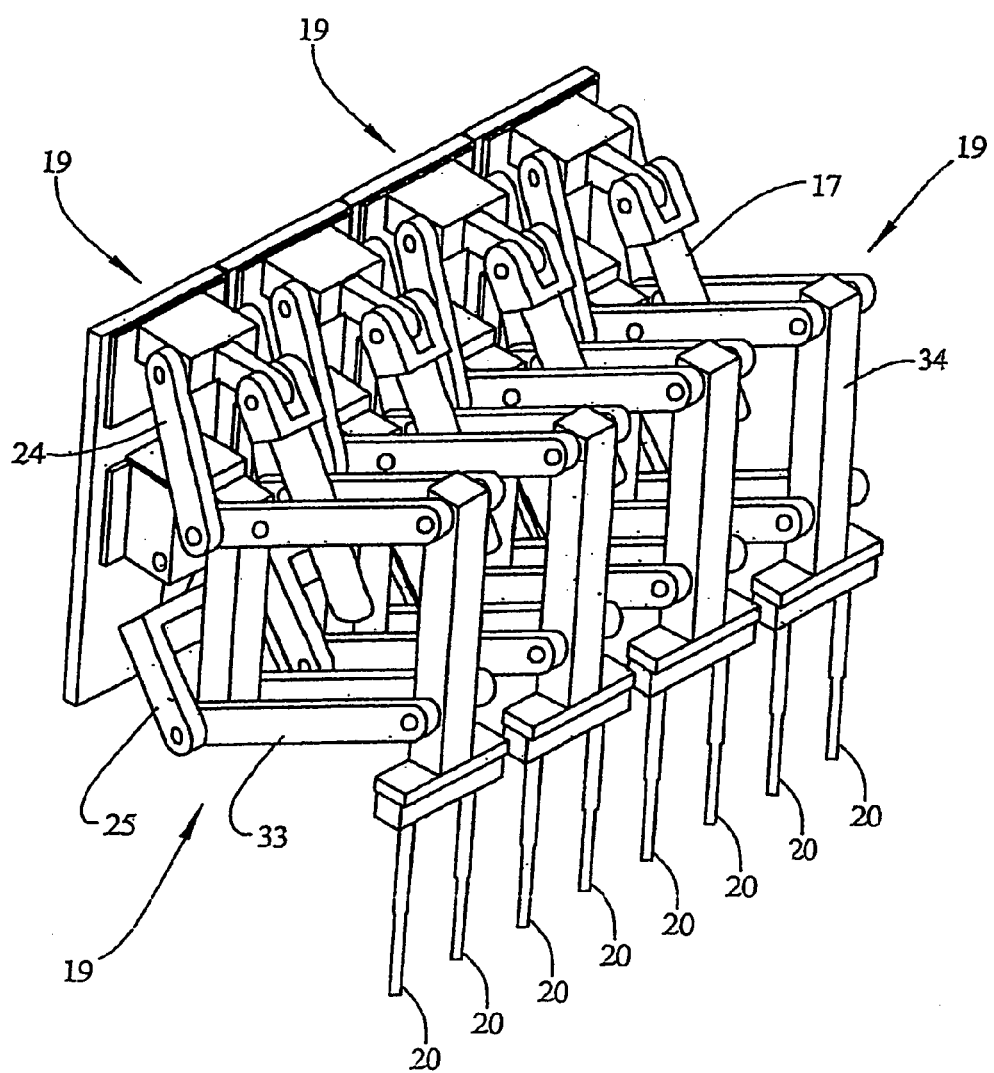
FIG. 4 is a perspective view of a further part of the cultivator of FIG. 1.

Four identical link arm assemblies 19 are mounted to frame 2. FIG. 3 is a detailed perspective view of one of the assemblies 19. FIG. 4 is a perspective view of the four assemblies omitting some of the detail of FIG. 3 for clarity. Each of the link arm assemblies mounts a pair of cultivation tools 20 only one of which is visible in the side views.

Figure 6:
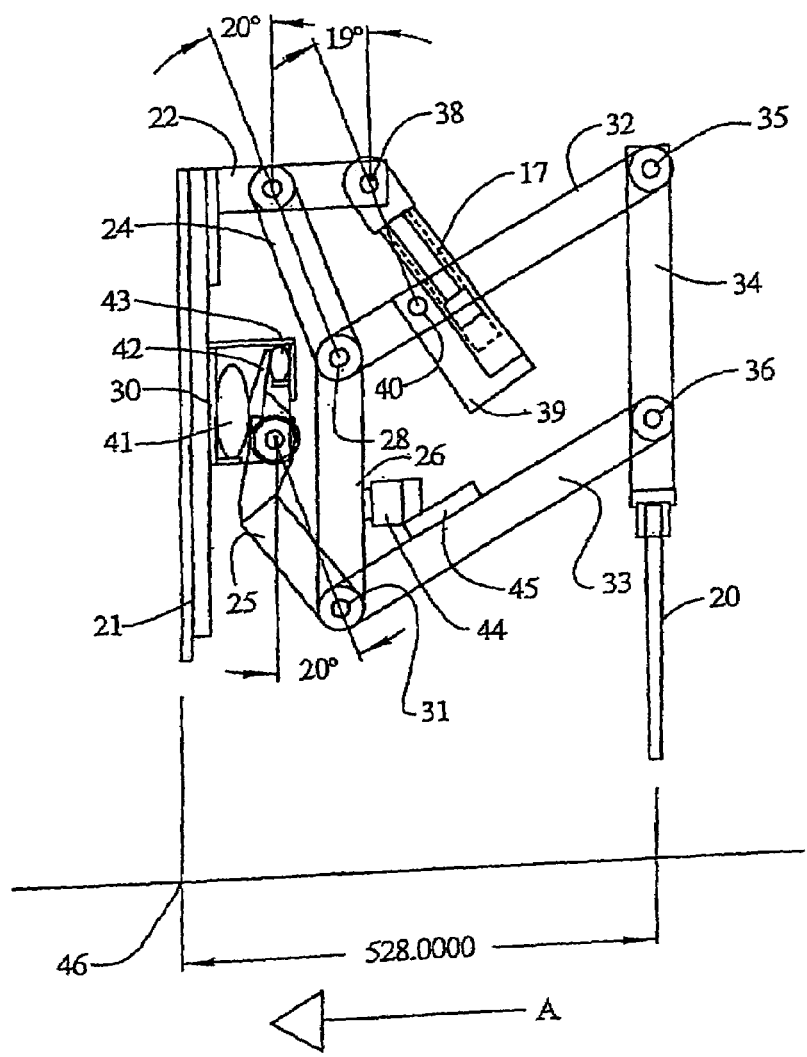
FIG. 6 is a side view of the link arm assembly of the cultivator of FIG. 1 at the beginning of an aeration cycle.

Each of the assemblies 19 has a base plate 21 which provides a mounting to support frame 2. A pair of link arms 24, 25 pivotally mount a follower 26 with the base plate 21. Upper link arm 24 is formed of two parallel elements 24a and 24b. Link arm elements 24a and 24b are mounted to a fixed support arm 22 that extends from base plate 21 by a pivotal connection at 27. The other ends of link arm elements 24a and 24b are pivotally connected to the follower 26 at pivot point 28. Lower link arm 25 is generally U-shaped and has two parallel elements 25a and 25b. A first end of link arm 25 is mounted with base plate 21 by a pivotal connection at 29 to a housing 30 fixed to the base plate 21 (FIGS. 6-16). The ends of link arm elements 25a, 25b are pivotally connected to the follower 26 at pivot point 31. In this way link arms 24 and 25 are spaced and have pairs of equally spaced pivot points (27, 28, 29, 31). This results in follower 26 being mounted for linear movement in a first direction toward and away from support frame 2 to which base plate 21 is mounted. By making the pivot points 27, 28, 29 and 31 coincide with the corners of a parallelogram the orientation of follower 26 with respect to the support frame 2 is maintained throughout this linear movement. As best seen in FIG. 6 link arm 25 is bent to form an obtuse angle.

A second pair of link arms 32, 33 pivotally mounts a tool support 34 outwardly from the follower 26. Link arm 32 is made up of two link arm elements 32a, 32b connected with the follower at pivot point 28. The other end of link arms 32a, 32b is pivotally connected at 35 to the upper end of tool support 34. Link arm 33 is also made up of two substantially parallel link arm elements 33a, 33b mounted with follower 26 at pivot point 31. The other end of link arms 33a, 33b is connected at pivot point 36 to tool support 34. Cultivator tools or tines 20 are mounted to the lower end of tool support 34. Pivot points 28, 31, 35 and 36 substantially lie on the corners of a parallelogram and link arms 32, 33 follower 26 and tool support 34 substantially form the sides of the parallelogram. This provides for a linear movement of the tool support member 34 in a direction perpendicular to the direction of movement of follower 26. That is, upwardly and downwardly with respect to the support frame 2 to which base plate 21 is mounted. This maintains the orientation of tool support 34 with respect to follower 26 throughout its range of movement. Thus if follower 26 is mounted so as to be perpendicular to the ground surface supporting the cultivator 1, tool support 34 moves upwardly and downwardly perpendicular to that surface. At the same time the first link arms 24, 25 allow movement of the follower 26 and hence tool support 34 toward and away from the support frame whilst vertical orientation is maintained.

It will be apparent that the first pair of link arms 24, 25 need not be parallel to each other so long as their respective pivot points are equidistant. Similarly, it is also within the scope of this invention that the second pair of link arms 32, 33 need not be parallel to each other but maintain their pivot points equidistant to each other. The parallelogram structure described above has been found to be the most suitable and convenient manner to meet this requirement of equidistantly spaced pivot points.

A driver in the form of a hydraulic cylinder 17 is provided to drive each of the linkage assemblies 19. One end of the hydraulic cylinder 17 is connected at pivot point 38 to an extension 23 of fixed support arm 22. A L-shaped bracket 39 connects the other end of hydraulic cylinder 17 to the upper link arm 32 at pivot point 40. In this way the hydraulic cylinder 17 effectively acts between the support frame (via base plate 21 and support arm 22) and the link arm 32.

The pivot points are arranged such that a line joining pivot points 27 and 28 is almost parallel to the line joining pivot points 38 and 40. The cylinder 17 and link arm 24 are arranged on the support arm 22 so that the cylinder 17 and link arm 24 are substantially parallel to each other. The pivot point 40 on support arm 32, which joins the cylinder 17 to link arm 32, determines the maximum outward extension to which the cylinder 17 may move link arm 32 relative to the support frame 2.

A bias element 41 is provided in housing 30. The link arm 25 has a pedal like extension 42 for engaging the bias element 41 to provide resilient damping at the extremity of movement outward from the support frame 2. This assists in urging the assembly 19 inward toward the support frame when it reaches the extremity of travel. A second element 43 is provided at the opposite side of the extension 42 to act as a resilient stop when the link arm assembly 19 moves back to the extremity of movement inward toward the support frame 2.

A stop 44 mounted by a bracket 45 on the link arm 33 for dampening the forces produced by retraction of the cylinder 17 in returning the linkage assembly 19 to the rest position.

Figure 2:
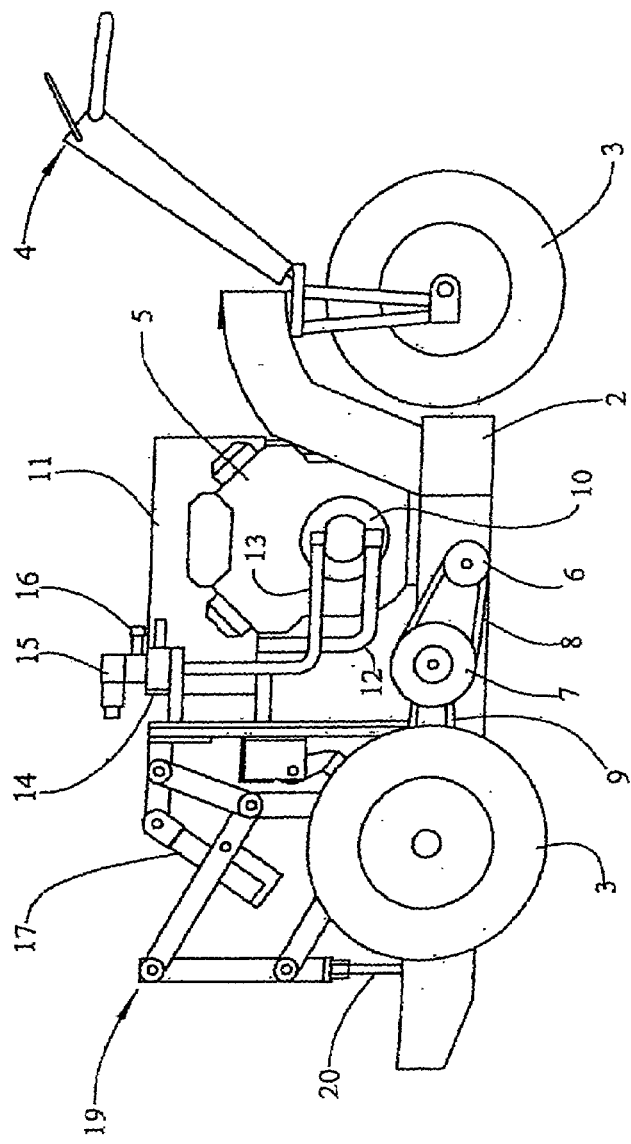
FIG. 2 is a view of the other side of the cultivator of FIG. 1.
Figure 5:
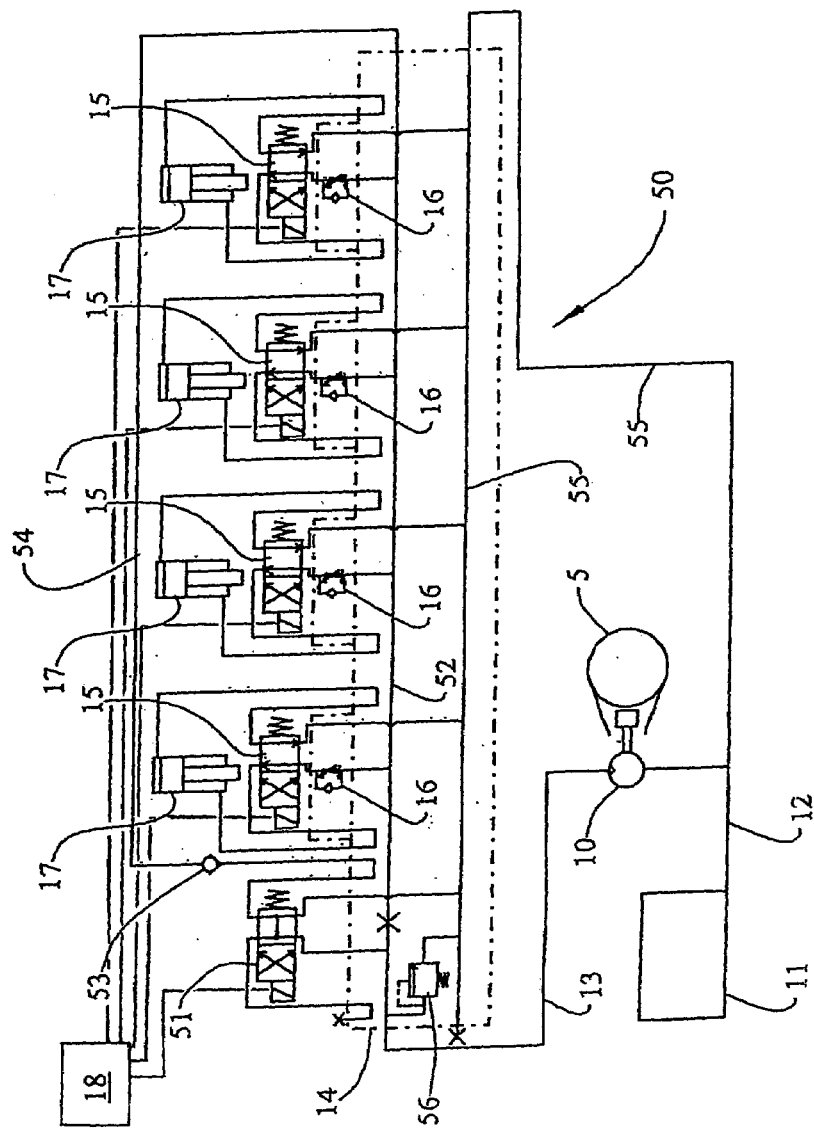
FIG. 5 is a schematic diagram of a hydraulic circuit forming part of the cultivator of FIG. 1.

FIG. 5 shows a schematic drawing of the hydraulic circuit 50 used for the control of hydraulic cylinder 17. As described above a motor 5 drives pump 10 to supply hydraulic fluid from a reservoir 11 to a manifold 14. The supply lines 12 and 13 shown in FIG. 2 are also shown respectively connecting reservoir 11 to pump 10 and pump 10 to manifold 14. Supply of hydraulic pressure to manifold 14 is effected by a solenoid control valve 51. When valve 51 is open hydraulic pressure is supplied via non-return valve 53 and line 54 to supply line 52 in the manifold 14. When valve 51 is closed hydraulic fluid returns to reservoir 11 via line 55. A pressure relieve valve 56 is fed upstream of control valve 51 to determine the hydraulic pressure maintained in the system. This valve is usually set between 750 and 1000 psi and discharges hydraulic fluid into return line 55 if the set pressure is exceeded. Manifold 14 thus provides hydraulic pressure to the flow control valves 16 which in turn supply pressure to solenoid valves 15. Actuation of the solenoid valves 15 allows fluid to flow to hydraulic cylinders 17 to effect operation in the usual way. Thus actuation of the solenoids 15 controls the operation of the cylinders 17 subject to the flow control of valves 16. The electronics module 18 provides electronic control for the sequential operation of the solenoids according to the speed of movement of the cultivator across the ground. The electronic control module is of standard configuration and is not described in detail.

The operation of cultivator 1 is substantially conventional in that the vehicle is traversed across the surface to be aerated and the tines 20 are operated to provide holes. The control of the hydraulic cylinders 17 by electronic module 18 ensures that the desired hole spacing along the direction of movement is achieved. FIGS. 7 to 11 show the sequential steps of operation of each of the linkage assemblies 19.

Referring to FIG. 6, the linkage assembly 19 is shown in a start or initial rest position at the beginning of the aeration cycle. The cylinder 17 and bias member 41 ensure that the follower 26 is at its lowest position towards the ground while the tool support member 34 is raised above the ground surface. Reference numeral 46 indicates the initial position of the support frame 2 with respect to the ground surface.

Figure 7:
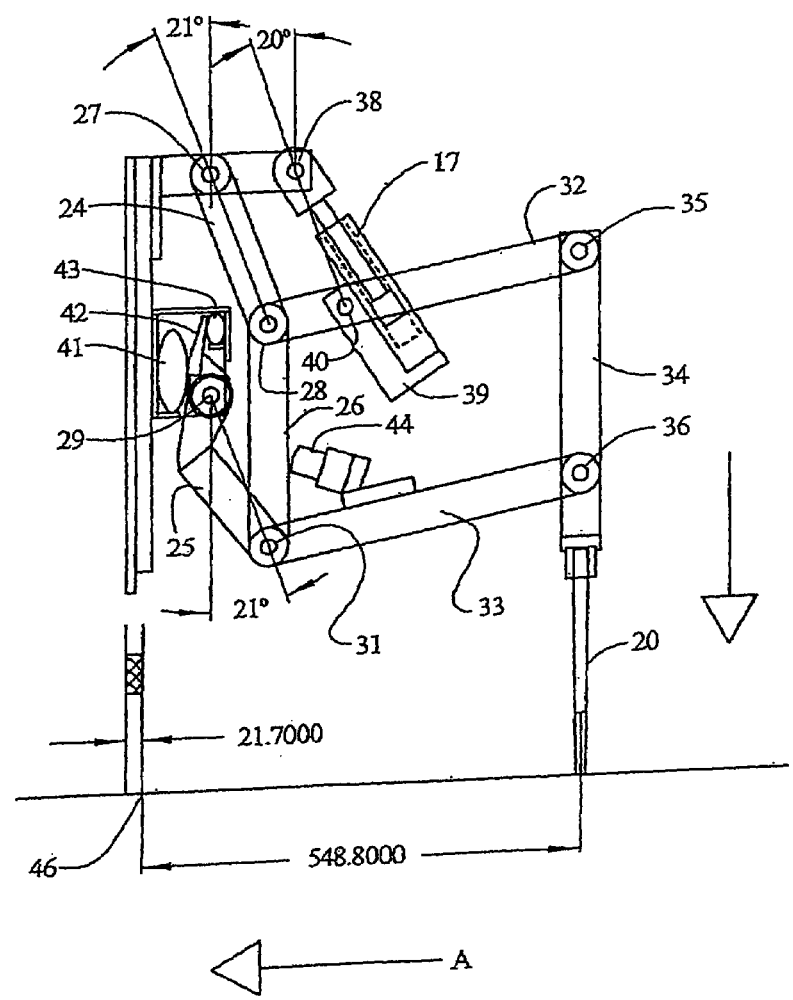
FIG. 7 is a side view of the link arm assembly of FIG. 6 at the point of ground engagement in the aeration cycle.

At the next part of the aeration time cycle, as shown in FIG. 7, the cylinder 17 forces link arm 32 down towards the ground surface. This causes tool support member 34 to move downward vertically, driving the cultivation tool 20 towards the ground surface. Due to the parallelogram structure of the follower-tool support arrangement, the force applied by the cylinder 17 to link arm 32 is transmitted to link arm 33 and tool support member 34 while the follower 26 remains stationary. As link arm 33 moves in unison with link arm 32, the tool support member 34 is made to move downwards in a straight line, ensuring that the cultivation tool 20 moves perpendicularly into the ground surface. The support frame 2 in this time has moved distance of 22 mm from its initial point 46.

Figure 8:
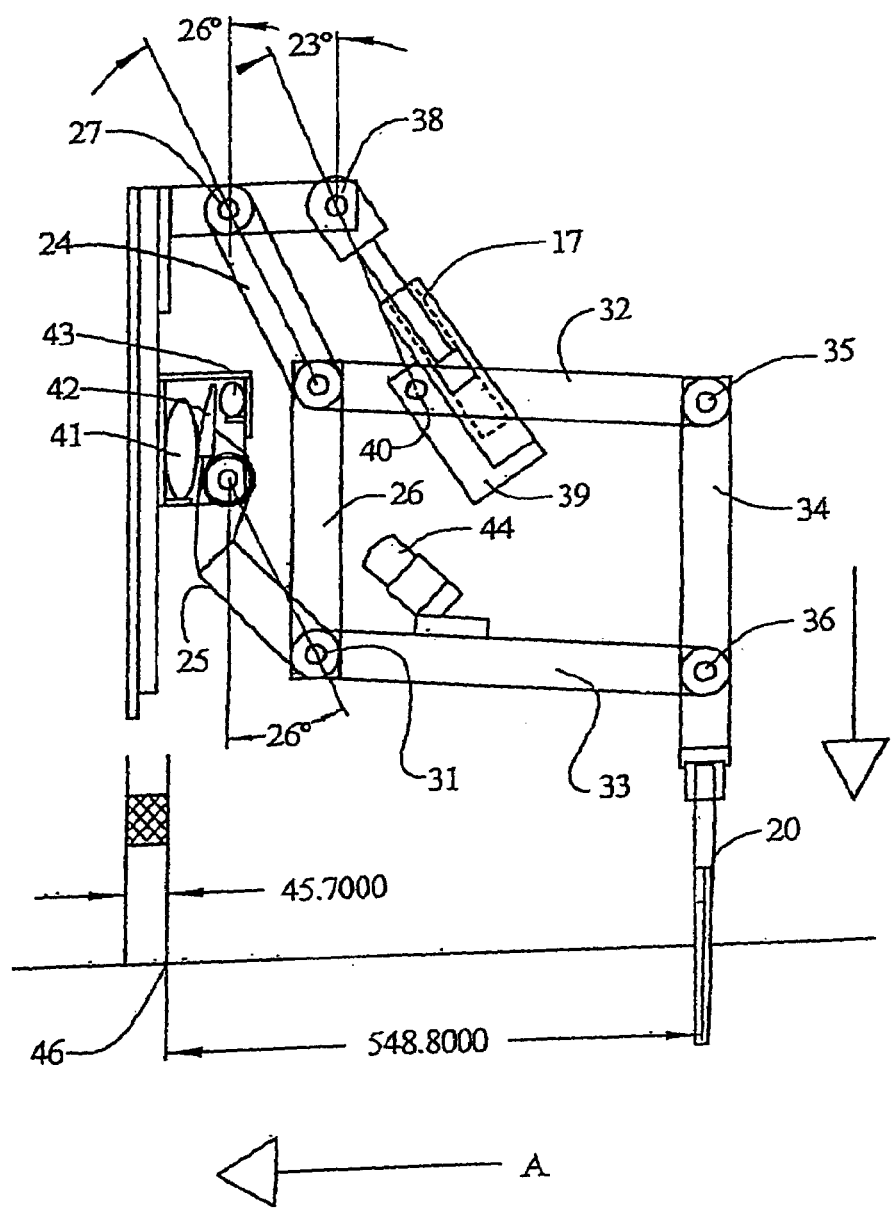
FIG. 8 is a side view of the link arm assembly of FIG. 6 at mid depth during ground engagement in the aeration cycle.
Figure 9:
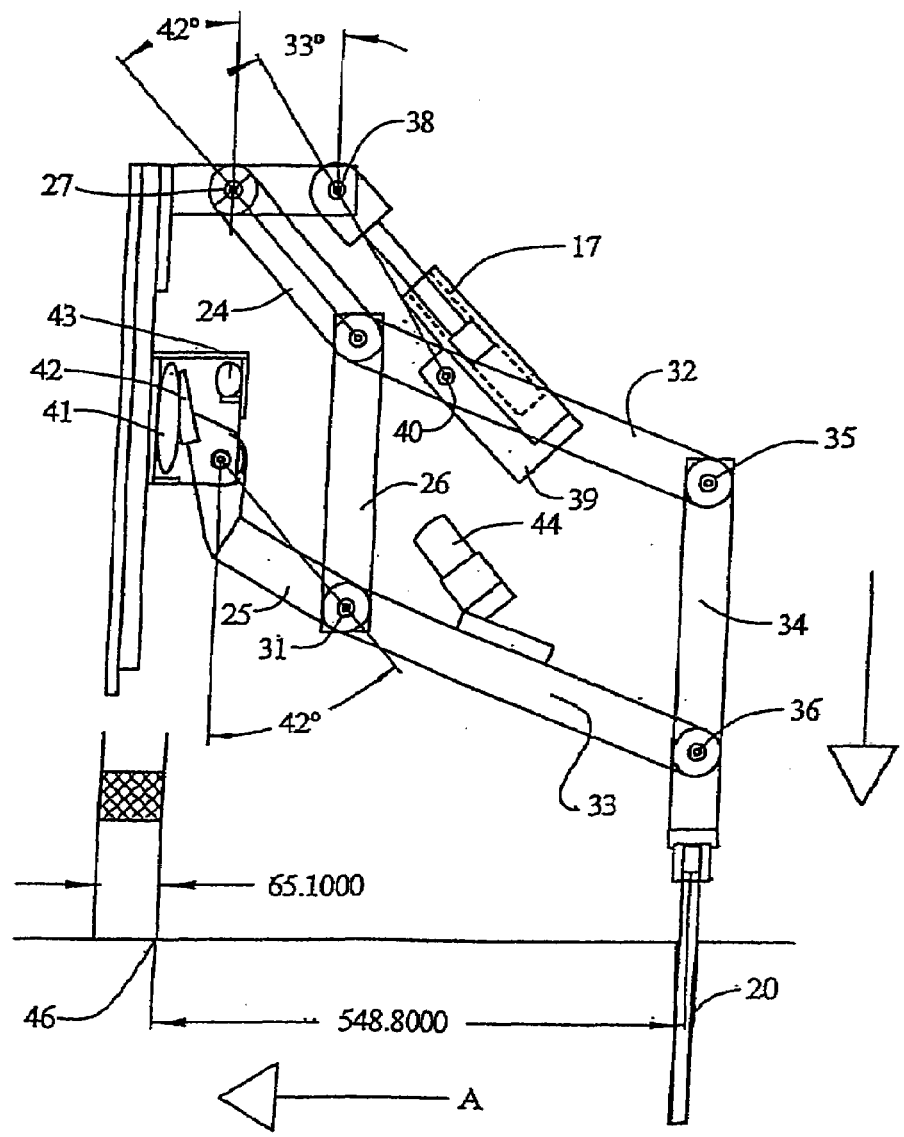
FIG. 9 is a side view of the link arm assembly of FIG. 6 at full depth of ground engagement in the aeration cycle.

FIGS. 8 and 9 illustrate the mid and full depth positions of aeration time cycle respectively. The cylinder 17 continues to apply force on the tool support member 34 via link arms 32, 33 so that the cultivation tool 20 penetrates the ground surface to most of its full length, forming the hole. The depth of the hole is determined by the extension of cylinder 17.

It can be seen that after engaging the ground surface, the cylinder 17 swings around pivot point 38 as the support frame 2 continues to move forward relative to the cultivation tool 20. There is a horizontal component of motion involved and the pivot point 38 allows the cylinder 17 to move the tine 20 (via link arms 32, 33 and tool support member 34) further from the support frame 2 in the horizontal direction. The follower 26 also moves in a linear fashion in a generally horizontal direction, allowing the support frame 2 to move laterally away from the tool support member 34. As pivot point 38 is the initial start point for the extension of the cylinder 17, pivot point 38 limits the maximum horizontal distance (relative to support frame 2) that cylinder 17 may move link arms 32,33.

It should also be noted that the cylinder extension is initially downward as the link arms 32, 33 are driven towards the ground surface. After the cultivation tool or tine 20 engages the ground surface, the movement of the cylinder 17 becomes more inclined as the support frame 2 continues its horizontal movement. Referring to FIGS. 6 to 8, the angle of the cylinder 17 relative to the vertical increases from initially 19° to a maximum of 40°. The increase in the angle of the cylinder corresponds to the increase of the horizontal distance from of about 87 mm between the support frame 2 and the cultivation tool 20.

The link arm arrangement is particularly useful in providing increasing distance between the tool support member 34 and the support frame 2 when the second pair of link arms 32, 33 move below a horizontal position towards the ground surface. From the rest position when the cultivation tool 20 is uppermost and the link arms 32, 33 are angled upward until when link arms 32, 33 become horizontal, the tool support member 34 is moving away from the support frame 2 as the frame 2 moves forward. When the link arm 32 moves below the horizontal then the tool support 34 starts to swing in an arc back towards the frame 2, reducing the distance between the tool support member and the frame 2. During this stage the parallelogram structure itself drifts away from the support frame 2 to compensate for this swing towards the support frame 2. Once the cultivation tool 20 is at full depth and in the withdrawal phase, the tool support member is moving away from the support frame 2 relative to the ground and so no drift by the parallelogram is needed, although the drift of the parallelogram structure effected by link arms 24, 25 is constantly compensating and providing accurate lateral movement at all times. The parallelogram structure of the follower-tool support arrangement is required to drift during the period between the link arms 32, 33 being horizontal and the tool 20 is at full depth penetration. That is, when link arms 32, 33 are below the horizontal.

As the support frame 2 continues to move horizontally along the ground surface, the horizontal component of motion is transmitted to link arm 25, causing pedal 42 to engage bias member 41. The force arising from the horizontal movement of the support frame 2 distorts the bias member 41 so as to accommodate this horizontal force so that the cultivation tool or tine 20 remains stationary to form a vertical hole. That is, bias member 41 acts against the force applied by the support frame 2 once the cultivation tool or tine 20 engages the ground. Consequently, the bias member 41 will apply a restoring force via pedal 42 to assist in returning link arms 32, 33, follower 26 and tool support 34 to the rest position.

Figure 10:
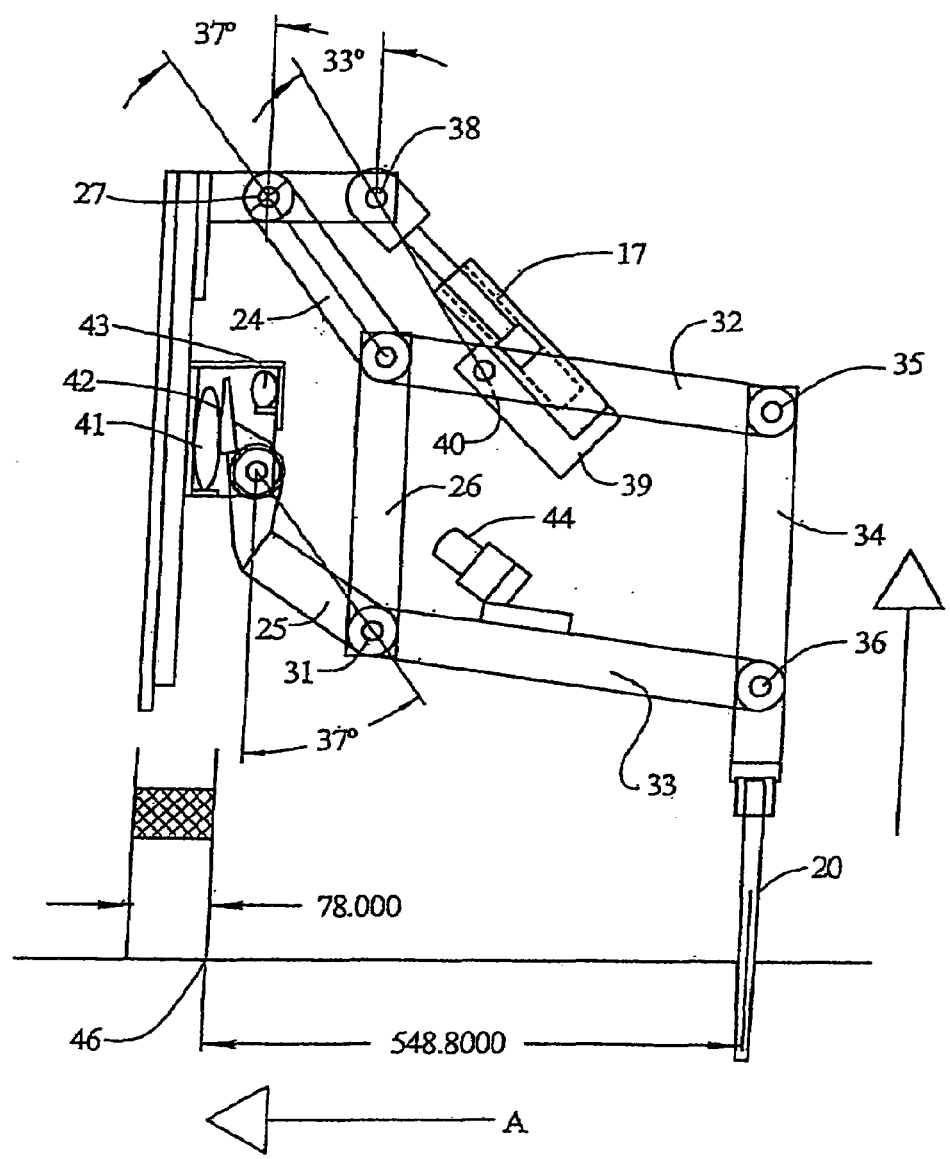
FIG. 10 is a side view of the link arm assembly during withdrawal from ground engagement in the aeration cycle.
Figure 11:
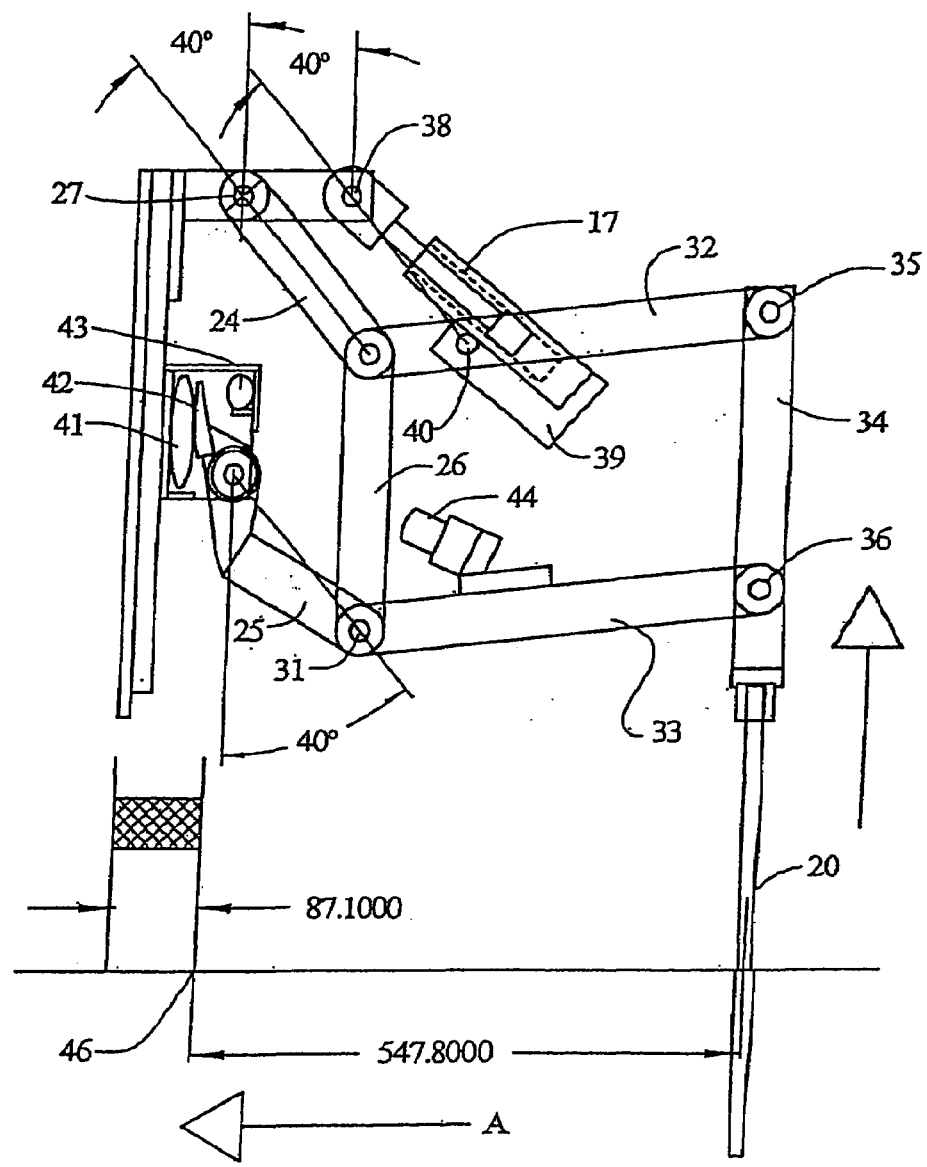
FIG. 11 is a side view of the link arm assembly of FIG. 6 at the point of disengagement of the ground in the aeration cycle.

Referring to FIG. 10, once the hole of required depth has been formed, the withdrawal phase of the aeration time cycle begins. The cylinder 17 now applies a pulling force on the link arm 32. This pulling force causes link arm 32 to rise in an inclined angle towards the rest position. This pulling force is transmitted to the tool support member 34 via parallel link arms 32, 33 causing the cultivation tool 20 to withdraw from the ground surface until it is clear of the ground surface (see FIG. 11). Thus, the alignment of cylinder 17 moves follower 26 and link arms 32, 33 through the required angle in both the downward and upward strokes of the aeration time cycle, respectively.

In addition, the bias member 41, which has been distorted by accommodating the horizontal force arising from the increased horizontal distance between support frame 2 and cultivation tool 20, returns to its initial shape. This restoring force applied by the bias member 41 assists in returning follower 26 and tool support 34 to the rest position. Stop 44 ensures that the cylinder 17 does not completely close on the upstroke of the withdrawal phase to prevent wear and damage to the retraction of the cylinder 17 when the follower-tool support arrangement returns to the rest position. The assembly 19 is then ready for the aeration time cycle to begin again.

During the whole aeration time cycle (i.e. the cultivation tool/tine 20 being forced towards, penetrating into and withdrawing from the ground surface), the cultivating device continues to move along the ground surface. At all times during the aeration time cycle, the tool support member 34 and cultivation tool 20 are kept perpendicular relative to the ground surface as the parallelogram structure of the follower-tool support arrangement in effect "stretches" lengthwise to compensate for the increasing distance between the tool support member 34 and support frame 2. In contrast, the known cultivating device relies on the link arm joining the tool support member to the support frame to compensate for the relative horizontal movement of the support frame.

Under control of module 18 the hydraulic circuit 51 can adjust the frequency in which the cylinders 17 apply force to the link arm 32 so that the operative phase can be varied as required. A higher frequency means a shorter aeration cycle so that the tool support member 34 moves more often, resulting in more holes being formed by the cultivation tool 20 in a given surface area.

A cultivating device was made in accordance with the present invention having the same features as the preferred embodiment described above. The cultivating device used a 25 horsepower motor and traversed 5 m in 24 seconds with holes being formed 100 mm apart. The cultivating device used four driver-followers with two vertical tines mounted on each of the tool support members. The hydraulic circuit was set with an aeration time cycle of 120 "shots" (i.e. penetrations of the ground surface) per minute. It was found that the tines could make deeper holes of 8" to 10", whereas holes made by machines of a similar scale and power were of about 5" to 6" deep.

Figure 12:
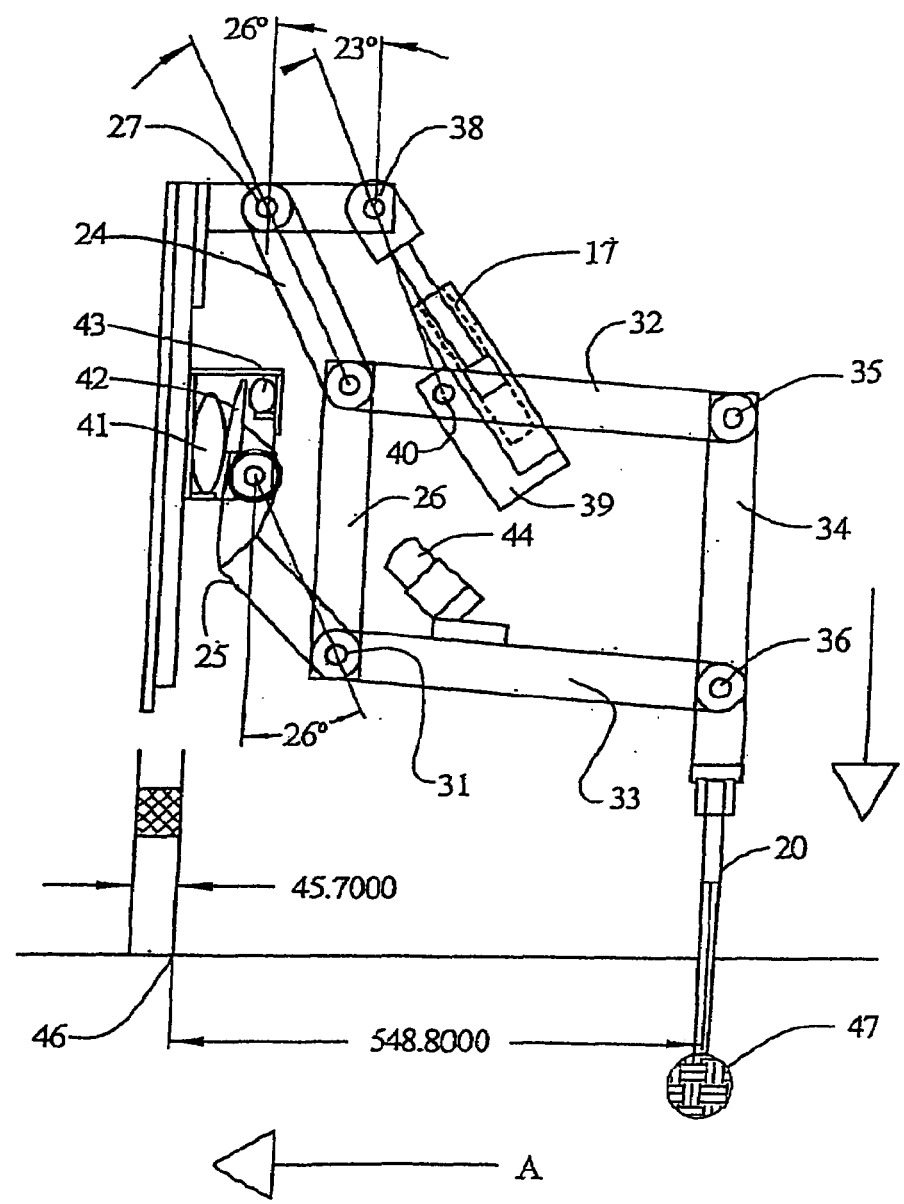
FIGS. 12 and 13 are side views of the link arm assembly of FIG. 6 illustrating operation where the cultivation tool strikes an obstruction during the aeration cycle.
Figure 13:
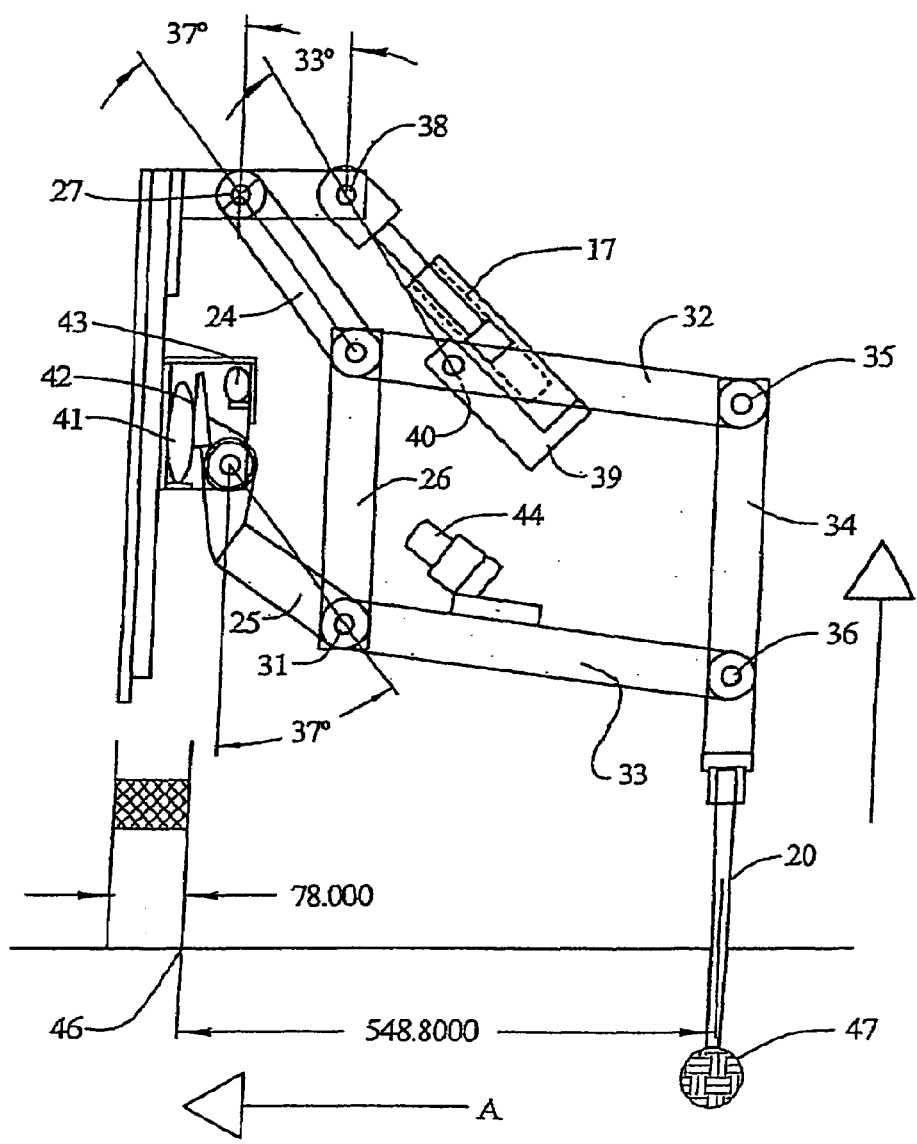

FIGS. 12 and 13 illustrate the situation where one of the cultivation tools or tines strikes an obstruction during the operative phase of the aeration time cycle. In this event adjustable relief pressure control on the hydraulic system via the control circuit 51 limits the load on the cultivation tool 20. As the hydraulic cylinders 17 operate by time, the cultivating device can compensate for the cultivation tool 20 striking an obstruction 47 underneath the ground surface, such as a rock. When a tine 20 strikes an underground obstruction 47, the circuit 51 detects that the load limit has been reached by means of relief valve 56. This stops cylinder 17 applying any greater downward force on the tool support member 34 and stopping cultivation tool 20.

The circuit 51 maintains the position of the cylinder 17 until the withdrawal phase. The cylinder 17 then withdraws the tool support member 34 and cultivation tool 20 in the usual way the aeration time cycle can begin again on a fresh part of the ground surface.

Although the circuit 51 stops movement of the attached cylinder 17 until the withdrawal phase begins, the aeration time cycle continues uninterrupted for the other tines 20 and the support frame 2 is free to continue its horizontal movement. That is, the other tines 20 continue to operate normally in their operative phases as the support frame 2 continues its horizontal movement as part of the aeration time cycle. During the period when the cylinder 17 is stopped, there is no restriction to the extension of the follower-tool support arrangement to accommodate forward motion of the support frame. This ensures that any particular follower—tool support arrangement can reset itself to the rest position after striking an obstruction.

None of the known cultivating devices provides for detecting a cultivation tool striking an obstruction and/or halting the cylinder while the aeration time cycle continues for other cultivation tools as well as allowing for the support frame to continue its horizontal movement. Therefore, in contrast to the prior art, this embodiment in accordance with the invention pauses the cylinder where a tine strikes an obstruction, allowing the aeration time cycle to continue until the withdrawal phase begins and so does not interfere with subsequent aeration time cycles.

In addition, alternative drivers other than hydraulic cylinders can be used to drive the follower. Such drivers include pneumatic systems, mechanical drivers and other drivers known to a person skilled in the art.

Figure 14:
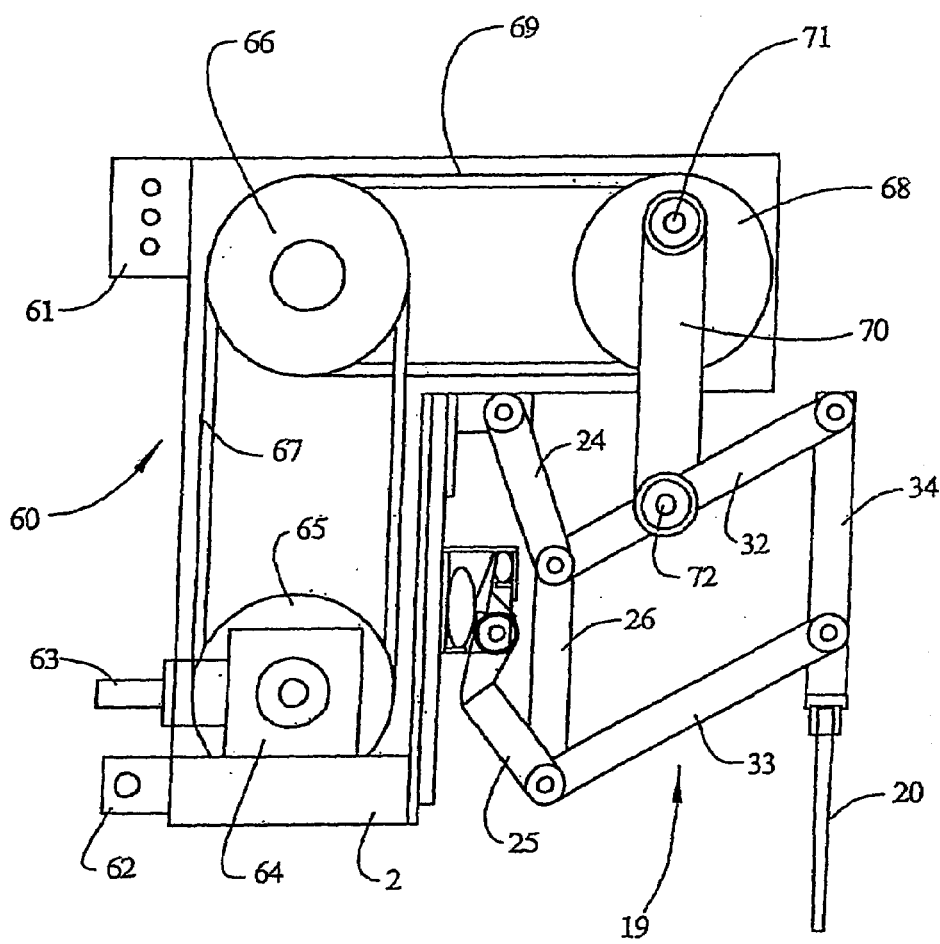
FIG. 14 is a side view of a link arm assembly similar to FIG. 6 showing a second embodiment of the invention.

FIG. 14 shows a second embodiment of the present invention using a mechanical driver. The link arm assembly 19 of this embodiment is identical to that described in relation to FIGS. 1 to 13 and the description will not be repeated. The same reference numerals have been used to identify corresponding features.

The cultivator 60 of the second embodiment is designed for attachment to the three point linkage of a tractor (not shown). Support frame 2 is modified to include upper and lower three point linkage attachments 61, 62 of conventional type. The cultivator 60 is driven via an input shaft 63 that is coupled with the power take off of a tractor (not shown). Input shaft 63 drives a gearbox 64 which in turn drives a pulley 65. Pulley 65 drives a jack shaft pulley 66 via conventional V-belt 67. The jack shaft pulley 66 in turn drives a flywheel 68 using a conventional V-belt 69. The flywheel 68 is thus driven in rotation by the power take off of the tractor in a conventional manner. A connecting rod 70 is pivotally connected at 71 with the flywheel 68 at a distance from its rotational centre. The other end of connecting rod 70 is pivotally connected at 72 to link arm 32. It will be apparent that this configuration results in the connecting of rod 70 reciprocally driving the link arm 32 in response to rotation of the flywheel 68. The flywheel 68 is rotated anticlockwise when viewed in FIG. 14. This direction of rotation provides a horizontal component to the movement of connecting rod 70 which generally aids the outward and inward movement of the linkage assembly during the corresponding downward and upward movement of the tool 20. The extent of reciprocating movement is determined by the size of the flywheel 68 and the radial distance of the point of connection 71 as well as the location of connection 72 to the link arm 32. These parameters can be configured to provide the desired amount of reciprocating movement. Adjustment of the speed of the power take off drive determines the rate of reciprocating movement. Consequently the mechanical drive can provide the same operation as the hydraulic cylinder of the first embodiment.

Figure 15:
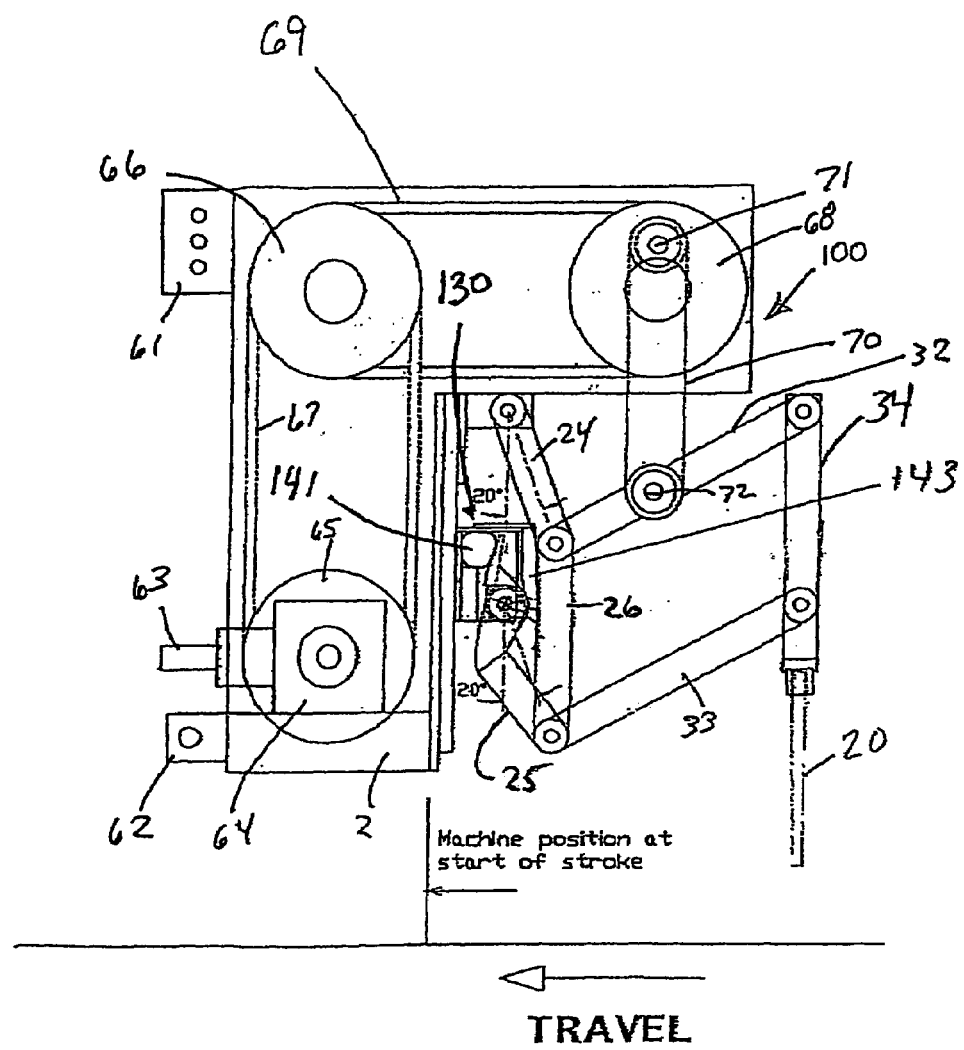
FIG. 15 is side view of a link arm assembly similar to FIG. 14 showing a third embodiment of the invention.
Figure 16:
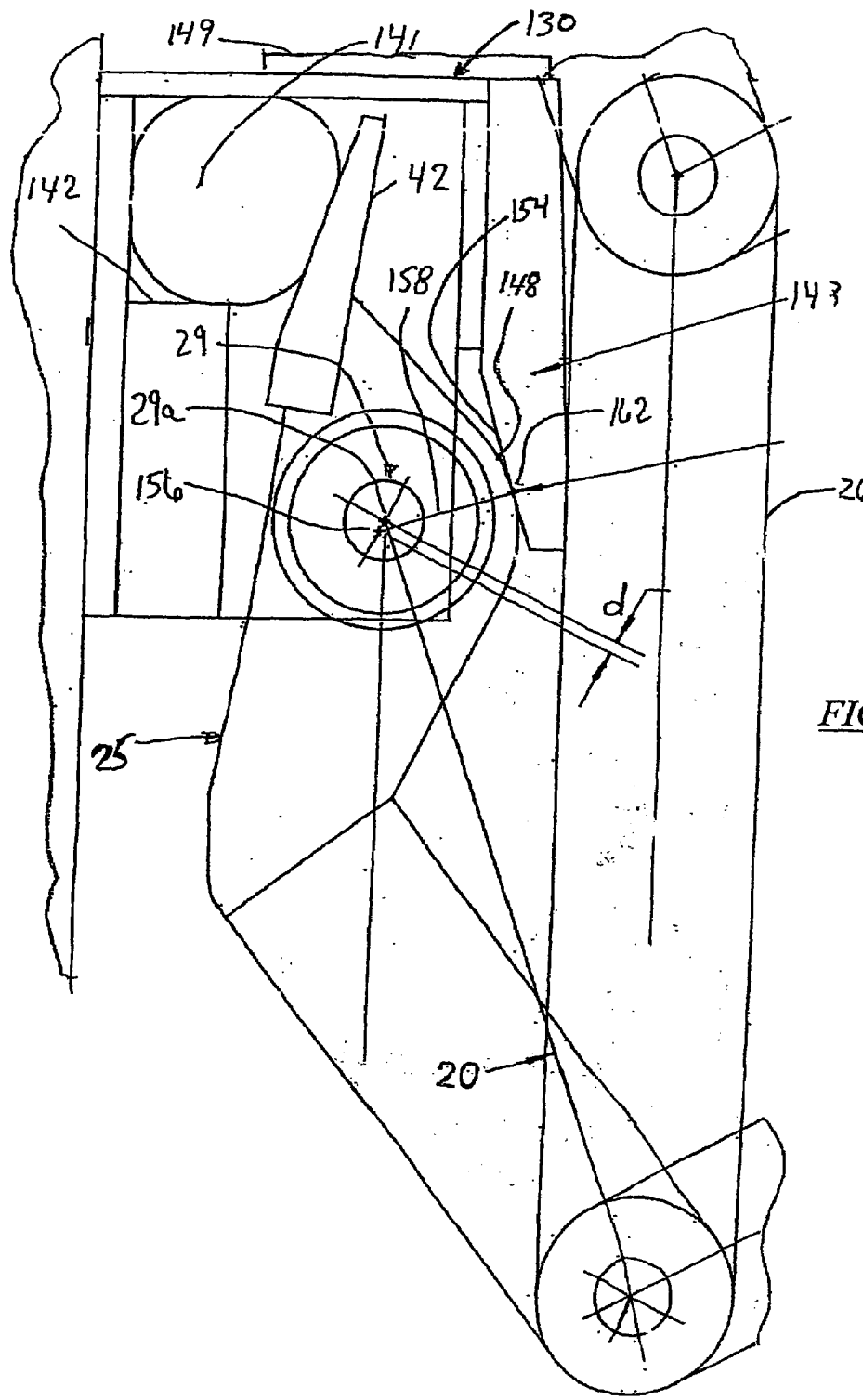
FIG. 16 is an enlarged, fragmentary side view of the third embodiment.

FIGS. 15 and 16 illustrate a third embodiment cultivating device 100 having a revised dampening arrangement within a housing 130. In all other respects the cultivating device is the same as that shown and described in FIG. 14. Although the cultivating device 100 is illustrated as a mechanically driven cultivating device, the dampening arrangement can also be applied to other cultivating devices, such as the cultivating device shown and described in FIGS. 1 through 13.

FIGS. 15 and 16 illustrate the cultivating device in the same position as shown in FIGS. 6 and 14. The position illustrated is at top of stroke for the tool support 34 and tine 20. According to the dampening arrangement, the dampener 43, heretofore described in FIGS. 6 and 14, is replaced with a dampening block 143. The bias element 41 is replaced with a smaller vertical profile bias element 141 supported on a fixed block 142. The profile of the arm 25 on which the pedal 42 is mounted provides a cam surface 148 that contacts the dampening block 143.

The dampening block 143 can be mounted via a bracket 149 and fasteners (not shown) to the housing 130. Alternatively the block 143 could be mounted to the follower 26, to move with the follower 26. The dampening block 143 provides a contact surface 154 that is angled to be substantially tangential to the cam surface 148. Preferably, a center point 156 of a radius 158 of the cam surface, the radius 158 that passes through a midpoint 162 of the contact area of the cam surface 148 with the block 143 (in the position shown in FIGS. 15 and 16), is offset by a distance d with respect to a pivotal axis 29a of the arm 25. According to one embodiment, this offset distance d can be 3 mm. This offset provides for a progressive frictional engagement of the cam surface 148 with the block contact surface 154 as the arm rotates clockwise about the axis 29a. The offset also provides a progressive frictional engagement of the cam surface 148 with the block contact surface 154 to prevent the arm 25 from rotating counter-clockwise about the pivot axis 29a. At the top of the stroke any tendency to rebound or bounce is thus substantially impeded. This impedance is effected by the cam surface 148 substantially preventing counter-clockwise rotation about the axis 29a. Connecting rod 70 is in a neutral position and is not urging lateral movement.

The bias element 141 expands and returns to its original shape as the linkage returns to the top of the stroke. The bias element 141 assists in forcing the pedal 42 to rotate clockwise in FIG. 16, to the full return position shown. The bias element 141 is advantageously composed of urethane having a Shore hardness of 70A.

As the arm 25 rotates clockwise, the cam surface 148 of the arm 25 progressively engages the dampening block 143 to progressively arrest clockwise rotation of the arm 25. The dampening block 143 is squeezed between the cam surface 148 on a front side and the follower 26 on a rear side. Accordingly, the arm 25 comes to a controlled, frictionally-induced stop instead of substantially compressing the dampening block 143 which would otherwise cause a subsequent counterclockwise rebound or bounce. The interaction of the cam surface 148 and the block 143 prevents rebound of the arm 25 in a counter clockwise direction, and this interaction is enhanced by the squeezing or clamping of the block 143 between the cam surface 148 and the follower 26. The dampening block 143 is made of a stiff material, such as urethane having a Shore hardness of 70D.

It can be appreciated that the system of a cam engagement of a relatively stiff surface to dampen movement induced by an expansion of a bias element can be embodied in a number of alternate ways, all encompassed by the present invention.

The improved dampening arrangement is intended to enable the tine to utilize the full amount of lateral movement ("lateral" being along the direction of travel of the cultivator along the ground surface) that any linkage design affords.

The dampening arrangement of FIGS. 15 and 16, utilizing a bias element and a cam-engaged dampening block, can also be effectively used in other cultivating device configurations, such as the devices disclosed in U.S. Pat. No. 5,988,290, herein incorporated by reference. Particularly, the buffer arrangement depicted in FIGS. 7 and 8 of U.S. Pat. No. 5,988,290 could be replaced by a bias element and cam-engaged dampening block in accordance with the present invention.

The dampening configuration of FIGS. 15 and 16 is advantageous in that it reduces or eliminates "bounce" when the tool support returns to the top of the stroke. Bounce is a problem that has been particularly encountered with mechanical versions of the cultivating device which operate at a higher speed than hydraulic versions. This bounce disadvantageously causes the linkage arm to commence the downstroke in an already advanced position. Significant amounts of bounce disadvantageously reduces the advancement distance that can be achieved while still maintaining adequate ground surface finish and hole quality.

The tool support member may support any type of cultivation tool, such as a fork having several tines or a single tine. Other attachments may be employed by the tool support member as required.

The components of the cultivating device are generally made of metal, such as the support frame, follower, tool support member and cultivation tool. Other suitable resilient materials may be used to manufacture the components of the cultivating device.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The reference to any prior art in this specification is not, and should not be taken as, an acknowledgment or any form of suggestion that that prior art forms part of the common general knowledge.

The invention claimed is:

1. A cultivator for aerating a ground surface including:
   a support frame moveable relative to the ground surface;
   a follower pivotally connected to the support frame by a first pair of spaced link arms having two pairs of equidistantly spaced pivot points for linear movement of the follower along a first direction toward and away from the support frame;
   a tool support member pivotally connected to the follower by a second pair of spaced link arms having two pairs of equidistantly spaced pivot points for linear movement of a cultivating tool along a second direction substantially perpendicular to the first direction; and
   a driver to selectively effect cyclic movement of the tool support member along said second direction and effect movement of the follower along said first direction;
   a bias element to provide resilient damping of the movement of said follower along said first direction away from said support frame, wherein said resilient damping is provided at an extremity of movement of the follower outward from the support frame along said first direction to urge the follower in the direction of inward movement toward said support frame; and
   a dampening element to provide resilient damping of the movement of said follower along said first direction toward said support frame, said resilient damping provided at an extremity of movement of the follower inward toward the support frame in said first direction to progressively arrest movement of the follower in the direction of inward movement toward said support frame.

2. A cultivator as claimed in claim 1 wherein said first direction is substantially parallel to said ground surface and said second direction is substantially perpendicular to said ground surface.

3. A cultivator as claimed in claim 1 wherein said first pair of spaced link arms maintain said follower in a substantially constant orientation to said support frame.

4. A cultivator as claimed in claim 1 wherein said follower, said second pair of spaced link arms and said tool support member substantially form the respective sides of a parallelogram.

5. A cultivator as claimed in claim 1 wherein said driver acts on one of said second pair of spaced link arms.

6. A cultivator as claimed in claim 5 wherein said driver is a linearly operable device acting between said support frame and one of said second pair of spaced link arms.

7. A cultivator as claimed in claim 6 wherein said driver acts in a direction substantially parallel to the direction between the spaced pivot points of one of said first pair of spaced link arms.

8. A cultivator as claimed in claim 7 wherein said first pair of spaced link arms include an upper link arm and a lower link arm, said upper link arm being positioned adjacent said driver.

9. A cultivator as claimed in claim 8 wherein said support frame includes a fixed support arm to which both said upper link arm and said driver are connected.

10. A cultivator as claimed in claim 9 wherein said linearly operable device is a hydraulic cylinder.

11. A cultivator as claimed in claim 8 wherein said lower link arm is bent to form an obtuse angle.

12. A cultivator as claimed in claim 1 wherein said bias element acts against an extension of one of said first pair of spaced link arms.

13. A cultivator as claimed in any one of claims 1 to 12 wherein one or more of said first and second pair of spaced link arms is formed by two parallel elements.

14. A cultivator as claimed in any one of claims 1 to 5 wherein said driver includes a mechanical arrangement which imparts reciprocating movement to one link arm of said first and second pair of spaced link arms.

15. A cultivator as claimed in claim 14 wherein said driver includes a rotating flywheel and a connecting rod mounted to move reciprocally in response to rotation of the flywheel.

16. A cultivator as claimed in claim 1, wherein one of said first pair of spaced link arms comprises a cam surface formed thereon and said dampening element comprises a dampening block arranged to progressively engage said cam surface upon pivoting movement of said one of said first pair of spaced link arms.

17. A cultivator as claimed in claim 16, wherein said dampening block is sized and positioned to be squeezed between said cam surface and said follower when said tool support member is raised in said second direction.

18. A cultivator for aerating a ground surface including:
a support frame moveable relative to the ground surface generally along a first direction;
a tool support member connected to said support frame by at least two links, a first link pivotally connected to the tool support member at one end and pivotally connected to a second link at an opposite end, said second link pivotally connected to said support frame, said tool support member operable along a second direction substantially perpendicular to the first direction;
a driver to selectively effect cyclic movement of the tool support member in said second direction;
a bias element to provide resilient damping of the pivoting movement of said second link in a first rotary direction; and
a dampening element to provide resilient damping of the pivoting movement of said second link in a second rotary direction opposite said first rotary direction to progressively frictionally arrest pivoting movement of the second link in the second rotary direction; and
a follower connected to one of said first and said second links, wherein said second link comprises a cam surface and said dampening element comprises a dampening block arranged to progressively engage said cam surface upon pivoting movement of said second link, said follower movable toward said dampening block while said second link is pivoting in said second rotary direction, wherein said dampening block is sized and positioned to be squeezed between said cam surface and said follower while said dampening block is progressively engaged by said cam surface.

19. A cultivator as claimed in claim 18, wherein said dampening block comprises a cam contact surface that is angled to be substantially tangential to the cam surface.

* * * * *